Aug. 1, 1939.  R. E. WINCH  2,168,013
CONVEYER BELT
Filed July 8, 1937
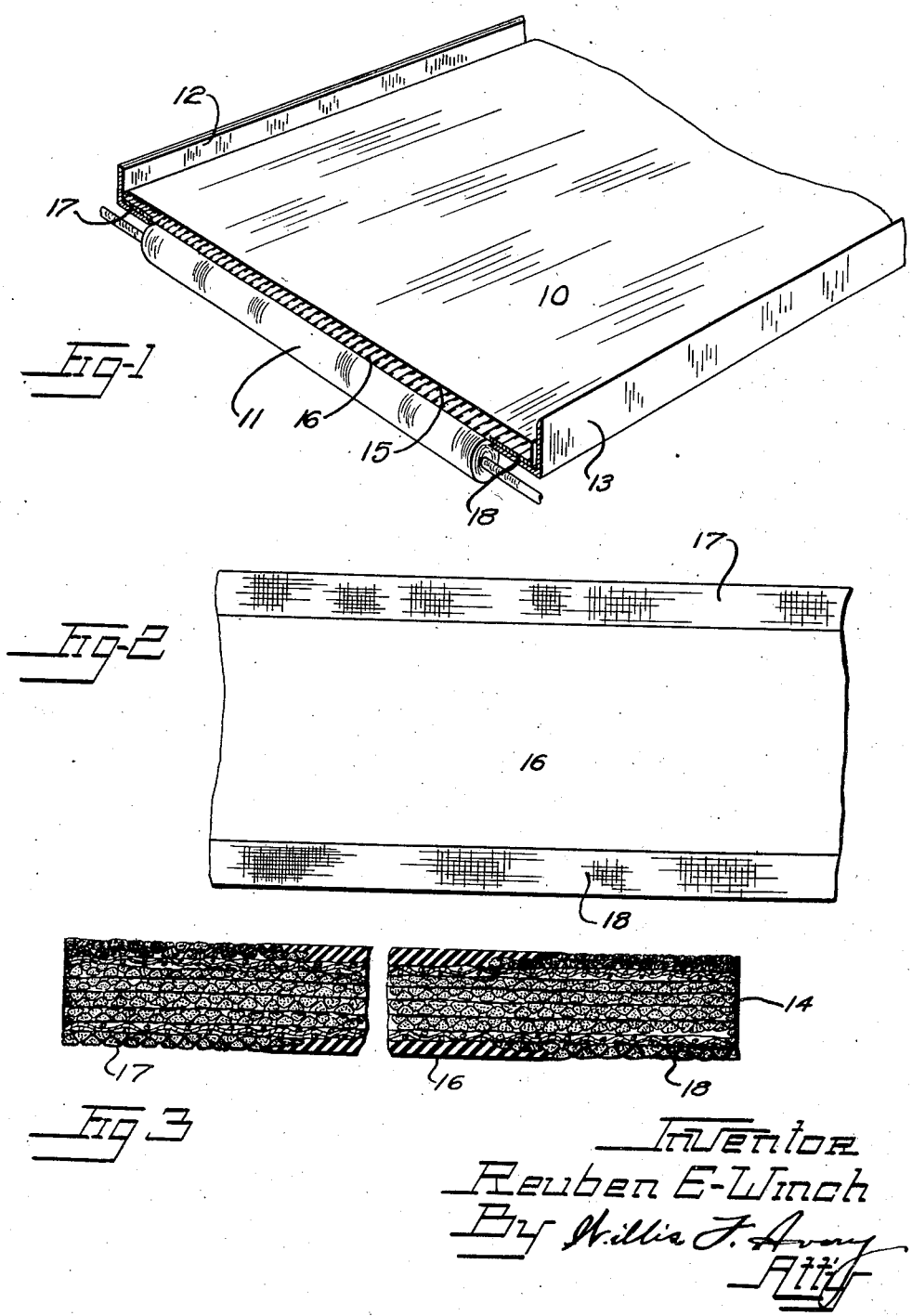
Inventor
Reuben E. Winch
By Willis F. Avery
Atty Patented Aug. 1, 1939

2,168,013

UNITED STATES PATENT OFFICE 2,168,013

CONVEYER BELT

Reuben E. Winch, Dallas, Tex., assignor to The B. F. Goodrich Company, New York, N. Y., a corporation of New York Application July 8, 1937, Serial No. 152,496

4 Claims. (Cl. 198—193)

This invention relates to conveyer belts, and is especially useful where such belts are used to convey heavy materials such as rock, coal and ore.

Where heavy materials are to be transported it is often convenient to support the conveyer belt upon rollers and in addition to provide supporting guide ways under its margins over which the margins of the belt slide. The belt is driven by contact with its inner surface and it carries the material on its outer surface. The sliding friction of the inner surface over the guides is very great, especially where the surface of the belt is made of rubber whereas the guides are of metal. As driving of the belt is accomplished by pulleys contacting only with its inner surface, great frictional resistance to the surface of the pulleys is necessary to prevent slippage.

The principal object of the present invention is to provide low frictional resistance to sliding along the guides together with high frictional resistance to pulley engagement on the same face of the belt.

This and other objects will appear from the following description and the accompanying drawing.

Of the drawing:

Fig. 1 is a perspective view of a portion of a belt constructed according to and embodying the invention in its preferred form, showing the supporting guides and one of the supporting idler rollers.

Fig. 2 is an under face view of a portion of the belt.

Fig. 3 is a cross-sectional view of a modification of the invention, showing a reversible belt.

Referring to the drawing, the numeral 10 designates the upper reach of the conveyer belt, the belt being trained about suitable driving pulleys with its upper reach supported by idler rolls 11, and its margins supported and guided by angle-iron guide ways 12, 13.

The body 14 of the belt may be formed in any desired manner but preferably comprises plies of textile material such as rubberized fabric or cords vulcanized together to provide the desired strength and pliability. A wear-resisting surface layer 15 of rubber is vulcanized to one face of the body and preferably extends entirely across the face so as to protect the body from shocks and abrasion on the side of the belt which contacts with the material to be handled.

On the opposite face of the body, a layer of vulcanized rubber 16 is provided, having high frictional characteristics with relation to the material of the driving pulleys. The rubber composition ordinarily employed for conveyer belts provides ample friction, although if desired the friction may be cork or mineral substance in the rubber composition. This layer extends only over that portion of the under side of the belt which does not contact with the guide ways 12, 13, and in order to reduce the friction of sliding engagement with those guide ways, the portions of the belt in contact therewith are formed with friction-reducing portions preferably comprising layers 17, 18 of material, preferably uncoated textile cords or fabric, and preferably having a thickness equal to that of the layer 16 so as to provide a level face across the belt, and to provide a substantial thickness for wear-resistance. While textile material is preferred for the layers 17, 18, other materials of a fibrous nature or otherwise, for example leather, may be employed to give the friction-reducing properties.

In the preferred form of the invention shown, the friction-reducing portions 17, 18 are integral with the other parts of the belt and are located along the margins of the lower face of the belt flanking the rubber pulley-engaging layer 16 of high frictional properties. The marginal face portions 17, 18 may be held to the belt body by an intervening layer of rubber adhered to the body and to the face portions, and to resist premature separation of these portions, their inner margins are preferably bevelled or pressed down as shown in Fig. 3 with the rubber of the layer 16 overlying the margins of these portions and securely anchoring them. In the manufacture of the belt the various parts are preferably assembled and then vulcanized in a single operation so as to be homogeneously united.

Where it is desired, the upper face of the belt may be similarly formed with marginal portions of friction reducing material, as illustrated in Fig. 3, so that as wear of the rubber face occurs from handling rough material, the belt may be reversed.

Various modifications may be made without departing from the scope of the invention.

I claim:

1. A flat conveyer belt comprising a plurality of layers of woven reinforcing fabric arranged in laminations extending from edge to edge of the belt and exposed at its side faces, a wear-resisting layer of rubber-like material on the material-supporting face of the belt, a narrow strip of bare woven fabric at each margin of the pulley contacting face of the belt adapted to slide along a stationary guideway, the strips having inner margins of the fabric thereof terminating at the intermediate pulley-engaging portion of the belt, and a pulley engaging layer of rubber-like material therebetween, the inner margins of said strips being overlapped by said pulley-engaging layer with the inner marginal portions of the strips held substantially parallel to the face of the belt without offset, said belt being of uniform thickness throughout.

2. A flat conveyer belt comprising a plurality of layers of woven reinforcing fabric arranged in laminations extending from edge to edge of the belt and exposed at its side faces, a wear-resisting layer of rubber-like material on the material-supporting face of the belt, a narrow strip of bare woven fabric at each margin of the pulley contacting face of the belt adapted to slide along a stationary guideway, the strips having inner margins of the fabric thereof terminating at the intermediate pulley-engaging portion of the belt, and a pulley-engaging layer of rubber-like material therebetween and flush with the strips with the inner marginal portions of the strips held substantially parallel to the face of the belt without offset, said belt being of uniform thickness throughout.

3. A reversible flat conveyer belt comprising a plurality of layers of woven reinforcing fabric arranged in laminations extending from edge to edge of the belt, and a wear resisting layer on each face thereof adapted to contact with the pulley or with the material to be conveyed, each wear resisting layer comprising margins of bare fabric exposed to contact slidably with a stationary guide at each margin of the belt, and a layer of rubber like material between the exposed fabric margins with the inner marginal portions of the strips held substantially parallel to the face of the belt without offset, said belt being of uniform thickness throughout.

4. A reversible flat conveyer belt comprising a plurality of layers of woven reinforcing fabric arranged in laminations extending from edge to edge of the belt, and a wear-resisting layer on each face thereof adapted to contact with the pulley or with the material to be conveyed, each wear-resisting layer comprising narrow marginal strips of bare fabric exposed to contact slidably with a stationary guide at each margin of the belt, and a layer of rubber-like material between the strips, with the inner marginal portions of the strips held substantially parallel to the face of the belt without offset, said belt being of uniform thickness throughout.

REUBEN E. WINCH.